SIDNEY P. HELD
INVENTOR.

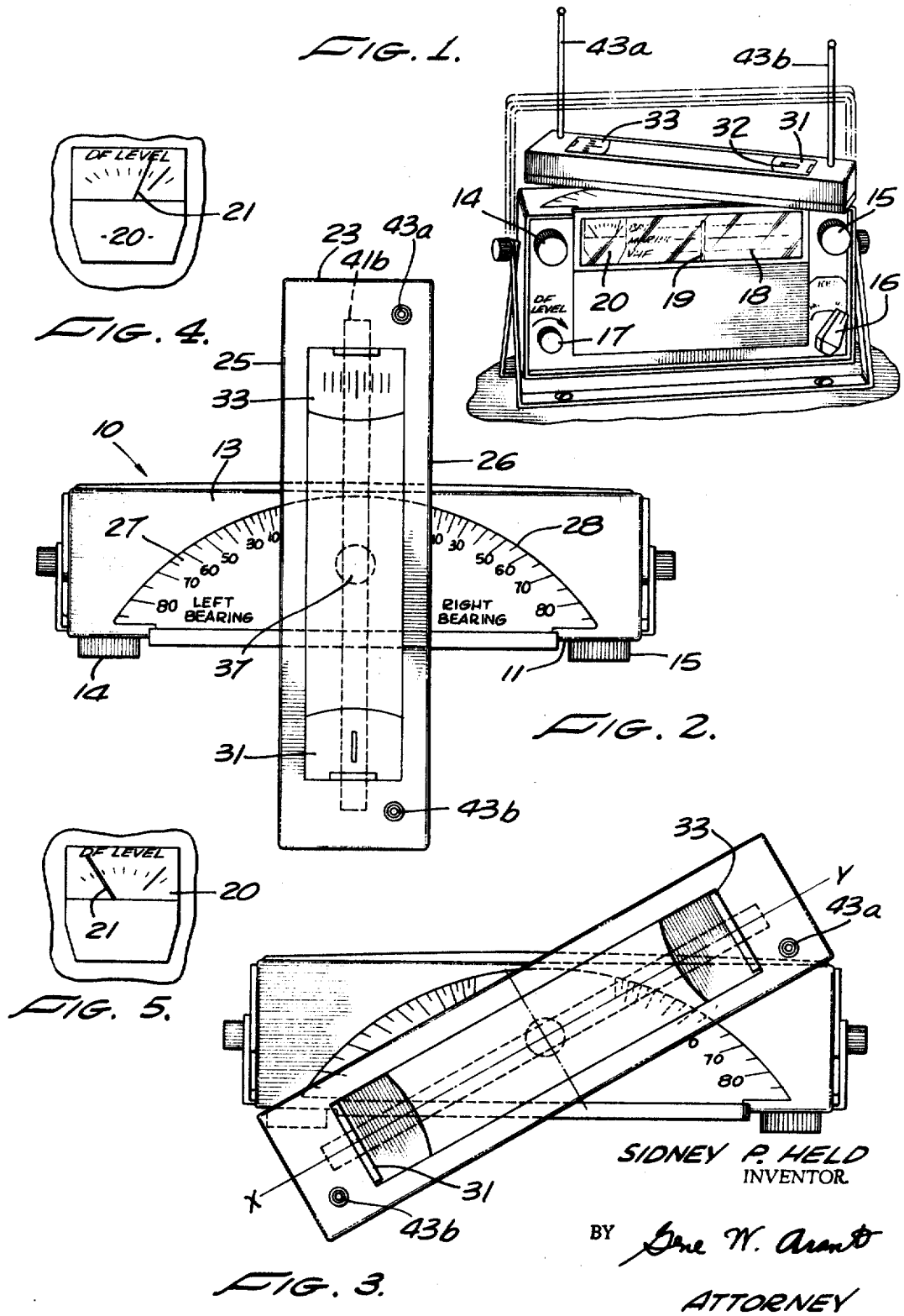

BY Gene W. Arant
ATTORNEY

United States Patent Office 3,323,129
Patented May 30, 1967

3,323,129
RADIO DIRECTION FINDER
Sidney P. Held, El Segundo, Calif.
(20810 Anza, Torrance, Calif. 90503)
Filed Apr. 10, 1964, Ser. No. 358,867
4 Claims. (Cl. 343—115)

The present invention relates to a directional antenna system which is especially adapted for use in conjunction with a direction-finding radio receiver.

In my copending application Ser. No. 235,712 filed Nov. 6, 1962 now U.S. Patent No. 3,164,833 I have disclosed and claimed a direction-finding radio receiver having a novel scale arrangement for indicating the angular direction of a rotatable antenna housing relative to the separate housing for the receiver. The same scale arrangement is again illustrated in the drawings of the present application, however, the invention which is sought to be claimed herein consists of a novel and unique directional antenna system.

The principal object of the invention is to provide a rotatable antenna system capable of receiving signals on two separate and distinct communication bands with a minimum of mechanical error in computing directional differences between two such received signals.

More specifically, it is an object of the invention to provide a rotatable antenna system for receiving either broadcast band signals or VHF (very high frequency) signals, as selected by a selection switch, with no mechanical change in the antenna system itself.

The objects and advantages of the present invention will be more fully understood from the following description considered in conjunction with the accompanying drawings, wherein:

FIGURE 1 is a perspective view of a radio direction finder incorporating the present invention;

FIGURE 2 is a top view of the same showing the detector element in a normal or zero position;

FIGURE 3 is a view similar to FIGURE 2 showing the antenna in a measurement position;

FIGURE 4 is a fragmentary view showing the direction finder level indicator;

FIGURE 5 is another fragmentary view showing the direction finder level indicator;

Figure 7:
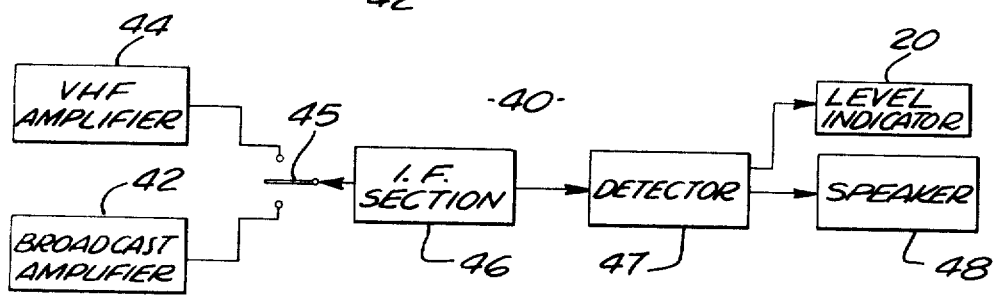
FIGURE 7 is a schematic circuit diagram of the receiver circuit.

Referring now to the drawing in more detail, the radio receiver 40 shown in FIGURE 7 is housed within a container 10 of generally rectangular configuration. The container 10 has various control shafts that extend through its front wall 11, upon which are mounted, respectively, an on-and-off and volume control knob 14, a tuning knob 15, a band selector knob 16, and a direction finder level knob 17. Front wall 11 has a window behind which is a scale 18 on which are inscribed one or more radio transmitter frequencies, and the receiver has a pointer or slider 19 movable across the scale 18 and actuated by tuning knob 15. Band selector switch 16 serves to tune or shift the receiver to the appropriate frequency being used.

A direction finder level indicator 20 is positioned to be visible through the window in front wall 11 and has a pointer 21 movable across the scale.

An antenna housing 23 houses antennas 41 and 43, subsequently described in more detail herein. The antenna housing 23 is shown as having a left side wall 25 and a right side wall 26. The antenna housing 23 is pivotably mounted, as indicated at 37, at substantially its midpoint and upon the midpoint of the flat top surface 13 of the receiver container 10.

A pair of bearing scales 27 and 28, indicating left bearing and right bearing, respectively, are laid out upon the top surface 13 in separated relationship as seen in FIGURE 2. These scales are arcuate in form and have markings from 0 to 90° which, in the prependicular position of the antenna housing as shown in FIGURE 2, run outward from opposite sides of the antenna housing.

A tab 31 having a viewing slit 32 is pivoted on the top of antenna housing 23 at or near one end thereof and is pivotable from the position shown in FIGURES 1 and 2 to that shown in FIGURE 3. A similar tab 33 of glass or other transparent material is similarly pivoted near the other end of the antenna housing and has a few graduations of one degree spacing by which, if the transmitting station or an associated land mark is visible, it can be "sighted" through the slit 32 to place a "fix" on such station.

The radio receiver 40 is of the super-heterodyne type and the antennas 41 and 43 are directionally sensitive with minimum pickup when the antenna housing is aligned with the line of sight which includes the signal transmittal station. The level indicator 20 picks up the amplitude of the intermediate frequency of the carrier at the output of the second detector stage of the receiver.

In the operation of the invention the direction finder is set as shown in FIGURE 2 and a station to be "fixed" is tuned in by manipulation of tuning knob 15. The direction finder level indicator 20 is then brought to its maximum position as shown in FIGURE 4 by rotation of knob 17. The antenna housing 23 is then rotated either to the right or to the left to a position as indicated in FIGURE 3 at which the pointer 21 of the level indicator 20 is at a minimum position as shown in FIGURE 5. The "bearing" is thus read at 60 degrees on the right bearing scale 28 and the transmitting station then lies in one direction or the other along line XY.

It will be observed that the graduations of scales 27 and 28 are so arranged that the readings of the angular movement of the antenna housing are determined by the particular graduation of the scale which is aligned with side 25 or 26 of the antenna housing 23. It will also be observed that a relatively small angular movement of the antenna housing moves these side edges over a relatively large angular portion of the scales. Furthermore it will be apparent that the zero position of each of these scales is a readable position and is not covered by any portion of the antenna housing.

Figure 6:
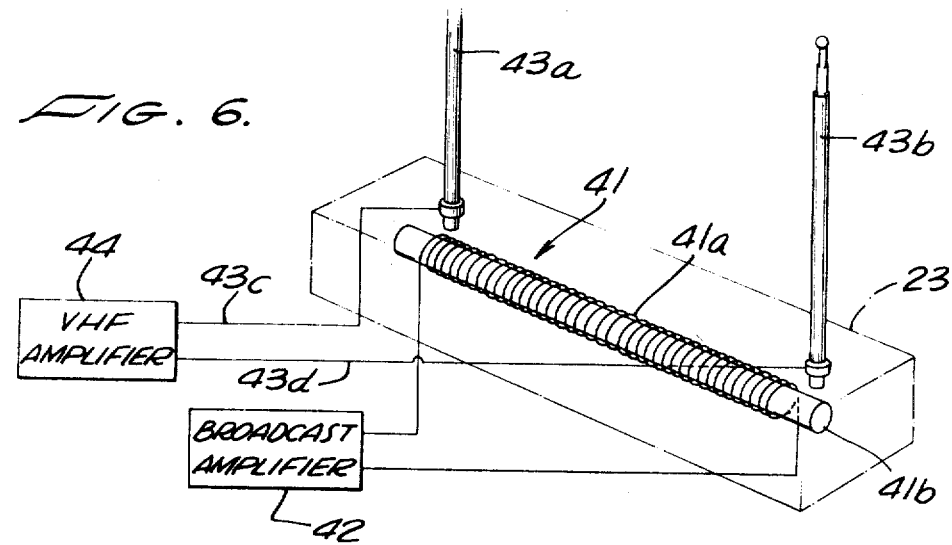
FIGURE 6 is a perspective view of the antenna elements showing schematically the remainder of the antenna system.

Referring now to FIGURE 6, it will be seen that the antenna 41 includes an elongated ferrite rod 41b which is disposed within and substantially along the longitudinal axis of the antenna housing 23, and a coil 41a which is helically wound almost the entire length of rod 41b. The two ends of coil 41a are coupled to the input terminals of a broadcast amplifier 42.

As also best seen in FIGURE 6, antenna 43 includes a parallel pair of straight, electrically conductive rod-like elements 43a and 43b. Elements 43a and 43b are disposed in a plane parallel to the longitudinal axis of coil 41a, and more specifically, are offset to one side of the longitudinal axis of antenna housing 23 in order not to interfere with the viewing devices 31 and 33. The elements 43a and 43b have their lower ends attached to antenna housing 23 adjacent respective ends of coil 41a, and extend vertically upward therefrom. The lower ends of the antenna elements 43a and 43b are coupled by respective lead wires 43c and 43d to the input terminals of a VHF amplifier 44.

As schematically illustrated in FIGURE 7, radio receiver 40 includes a selector switch 45 which couples the output of either the broadcast amplifier 42, or the VHF amplifier 44, to the I.F. section 46. The output of the I.F. section is coupled to a detector 47 which in turn drives both a loudspeaker 48 and the level indicator 20, as previously indicated.

Figure 8:
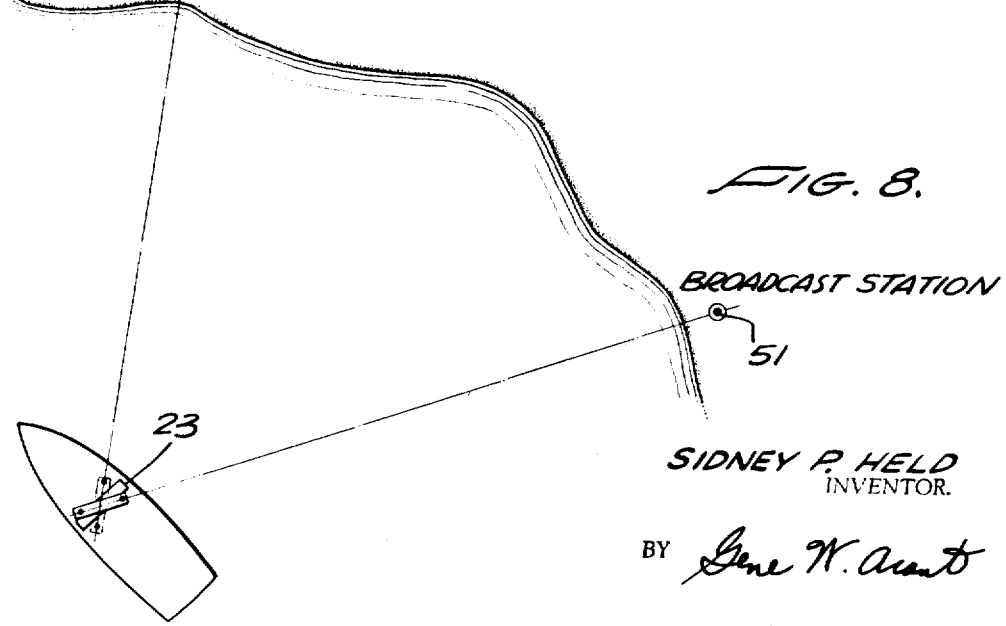
FIGURE 8 is a plan view illustrating triangulation between a VHF station and a broadcast station.

The operation of the device is best described with reference to FIGURE 8. The switch 45 may be placed in its upper position corresponding to VHF reception and the antenna housing 23 aligned with a VHF station such as that indicated at 50. The alignment while it may be assisted with the visual devices 31 and 33 is generally achieved by tuning the level indicator 20 for minimum amplitude, as previously described. At the point of minimum amplitude an angular measurement on one of the bearing scales 27 and 28 is noted. Then the switch 45 is placed in its alternate position and the antenna housing 23 is rotated into alignment with a broadcast station such as that shown at 51. Again the level indicator 20 is observed for minimum level, and at that point a reading on one of the bearing scales is noted. Simple addition of the two readings provides the angular difference between the two stations.

While the antenna housing 23 is preferably cast or formed from plastic insulating material it will be recognized that other equivalent materials may be utilized. The rectangular cross-sectional configuration of the antenna housing is not necessary so far as the achievement of the benefits of the combination of the two antennas 41 and 43 is concerned. However, the rectangular configuration does facilitate scale readings on the particular type of angular measurement scale herein illustrated.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

I claim:
1. A radio direction finder comprising, in combination:
 a main housing having an elongated, substantially flat upper surface;
 a radio receiver disposed within said main housing, said radio receiver including a VHF (very high frequency) amplifier, a broadcast amplifier, switch means for deriving input signals from a selected one of said amplifiers, and signal strength indicating means;
 an antenna housing having an elongated configuration in the horizontal plane and disposed upon said upper surface of said main housing;
 means mounting said antenna housing for pivotal movement in the horizontal plane relative to said main housing;
 a broadcast antenna including an elongated coil disposed within said antenna housing and extending lengthwise thereof;
 first circuit means coupled to the ends of said elongated coil, extending through said mounting means, and coupled to said broadcast amplifier;
 a VHF antenna including a pair of vertically extending, horizontally spaced, rod-like elements whose lower ends are secured to respective ends of said antenna housing;
 and second circuit means coupled to said lower ends of said rod-like elements, extending through said mounting means, and coupled to said VHF amplifier; whereby said signal strength indicating means may be selectively used in conjunction with either one of said antennas for direction-finding purposes.

2. A radio direction finder as claimed in claim 1 wherein said rod-like antenna elements are extensible in a vertical direction.

3. A radio direction finder as claimed in claim 1 which includes a pair of sets of angular scale indications on said main housing upper surface, one on each end of said main housing, the inner ends of said sets of scale indications being separated by a distance equal to the width of said antenna housing whereby when the longitudinal axis of said antenna housing is disposed perpendicular to the longitudinal axis of said main housing each longitudinal side edge of said antenna housing is aligned with the inner end of the corresponding set of scale indications.

4. A direction finder as claimed in claim 1 which further includes a pair of viewing tabs attached to corresponding ends of said antenna housing and pivotally movable between raised and lowered positions.

References Cited
UNITED STATES PATENTS

| | | | |
|---|---|---|---|
| 716,135 | 12/1902 | Stone | 343—115 |
| 2,987,616 | 6/1961 | Steglich | 325—361 |
| 3,164,833 | 1/1965 | Held | 343—115 |

RODNEY D. BENNETT, *Primary Examiner.*

CHESTER L. JUSTUS, *Examiner.*

R. E. BERGER, *Assistant Examiner.*